(12) United States Patent
Roh

(10) Patent No.: US 6,181,665 B1
(45) Date of Patent: Jan. 30, 2001

(54) VOLUME HOLOGRAPHIC DATA STORAGE SYSTEM

(75) Inventor: Jae-Woo Roh, Seoul (KR)

(73) Assignee: Daewoo Electronics Co., Ltd., Seoul (KR)

( * ) Notice: Under 35 U.S.C. 154(b), the term of this patent shall be extended for 0 days.

(21) Appl. No.: 09/161,220

(22) Filed: Sep. 28, 1998

(30) Foreign Application Priority Data

Dec. 29, 1997 (KR) .................................................. 97-76436

(51) Int. Cl.⁷ ........................................................ G11B 7/00
(52) U.S. Cl. .................... 369/103; 369/112; 369/178; 369/258
(58) Field of Search .................................... 369/103, 112, 369/58, 54, 93, 117, 178, 258, 263

(56) References Cited

U.S. PATENT DOCUMENTS 4,458,345 * 7/1984 Bjorklund et al. .................... 369/103
5,007,690   4/1991 Chern et al. .

FOREIGN PATENT DOCUMENTS 2326735  12/1998  (GB) .

* cited by examiner

Primary Examiner—Paul W. Huber
(74) Attorney, Agent, or Firm—Pennie & Edmonds

(57) ABSTRACT

A volume holographic data storage (VHDS) system incorporates therein a storage device having a plurality of storage media for storing multiple holograms. The VHDS system comprises a light source for generating a coherent light beam, a beam splitter for splitting the coherent light beam into a reference and a signal beams, a storage device having a base and a plurality of storage media mounted on the base for three-dimensionally storing the multiple holograms thereinto, a pair of mirrors for directing the signal and the reference beams to the storage device, respectively, and a motor for rotating the storage device about an axis perpendicular to a plane which includes the signal and reference beams, wherein the axis passes through a center point of the storage device. In the storage device, each of the storage media is mounted on top of the base angularly separated by an angle of βdegrees.

18 Claims, 3 Drawing Sheets

VOLUME HOLOGRAPHIC DATA STORAGE SYSTEM

FIELD OF THE INVENTION

The present invention relates to a volume holographic data storage system; and, more particularly, to a volume holographic data storage system incorporating therein a storage device mounted thereon a plurality of storage media for increasing the amount of holograms to be stored thereinto.

DESCRIPTION OF THE PRIOR ART

As is well known, demands for optically storing a large amount of data, such as a motion picture film, have been increasing. Therefore, various types of volume holographic data storage (VHDS) systems incorporating therein a storage medium have been recently developed for realizing high density optical storage capabilities, wherein the storage medium is conventionally made of lithium niobate(LiNbO$_3$) or strontium barium niobate(Sr$_x$Ba$_{1-x}$Nb$_2$O$_6$) and is used for three-dimensionally storing the data in the form of pages.

In FIG. 1, there is shown a prior art volume holographic data storage (VHDS) system 100 capable of storing multiple holograms. The VHDS system 100 comprises a laser 110, a beam splitter 120, a first and a second mirrors 130, 132, a spatial light modulator (SLM) 140, an object lens 150, a storage medium 160 and a charge coupled device (CCD) 170. In the system 100, a laser beam emitted from the laser 110 impinges onto the beam splitter 120 which is capable of partially reflecting the laser beam to thereby obtain a reference and a signal beams, wherein the reference beam is a portion of the laser beam transmitted through the beam splitter 120 and the signal beam is a remaining portion of the laser beam reflected from the beam splitter 120. The reference beam enters into the storage medium 160 after being reflected by the first mirror 130.

In the meantime, the signal beam enters into the SLM 140 which converts the signal beam impinged thereonto into a modulated signal beam after being reflected by the second mirror 132, wherein the modulated signal beam carries data in the form of pages after passing through the SLM 140. The modulated signal beam is focused on a recording area 162 of the storage medium 160 by the object lens 150. Conventionally, the storage medium 160 is in the form of a rectangular cube. The storage medium 160 is arranged in such a way that a central point of the recording area 162 therein coincides with the focal point of the object lens 150. In the storage medium 160, the modulated signal beam interferes with the reference beam at the recording area 162 to thereby generate an interference pattern therebetween, wherein the interference pattern contains information of the modulated signal beam. The interference pattern is converted to an optical index pattern in the storage medium 160 whose refractive index changes in response to the interference pattern to thereby record the modulated signal beam into the recording area 162 of the storage medium 160. If another page of data to be modulated by the SLM 140 is recorded on another recording area 162 of the storage medium 160, the VHDS system 100 can record the data by using an angular or a spatial multiplexing.

To read the stored data, the modulated signal beam retrieved from the storage medium 160 enters the CCD 170 which is capable of detecting the power of the retrieved signal beam. The retrieved signal beam is generated by diffraction of the reference beam from the storage medium 160.

In the above-described VHDS system 100, as the amount of holograms to be stored into the storage medium 160 increases, the volume of the storage medium 160 becomes larger to provide a lot of recording areas for an angular multiplexing or a spatial multiplexing. However, it is very difficult to produce a large volume of the storage medium 160 such as a photorefractive crystal without containing any defect or foreign material therein. In case that a defect or a foreign material is contained in the storage medium 160, it may generate a scattering noise or a distortion noise in the holograms, thereby making the reproduction of the holograms difficult.

SUMMARY OF THE INVENTION

It is, therefore, a primary object of the present invention to provide an improved volume holographic storage system capable of increasing the amount of holograms to be stored into a holographic storage medium.

In accordance with the present invention, there is provided a volume holographic data storage system for storing a plurality of holograms, the storage system comprising: a light source for generating a coherent light beam; a beam splitter for splitting the coherent light beam into a reference and a signal beams; a storage device for storing the holograms thereinto, the storage device including a base having a top surface and N number of storage media, N being a positive integer, larger than 1 each of the storage media being mounted on the top surface of the base and made of a photorefractive crystal; a pair of mirrors for directing the signal and the reference beams to a cross point formed by intersecting therebetween; and a controller for controlling the storage device in such a way that each of the storage media sequentially aligns with the cross point.

BRIEF DESCRIPTION OF THE DRAWINGS

The present invention together with the above and other objects and advantages will become apparent from the following description of preferred embodiments, when given in conjunction with the accompanying drawings, wherein.

DETAILED DESCRIPTION OF THE PREFERRED EMBODIMENTS

Figure 1:
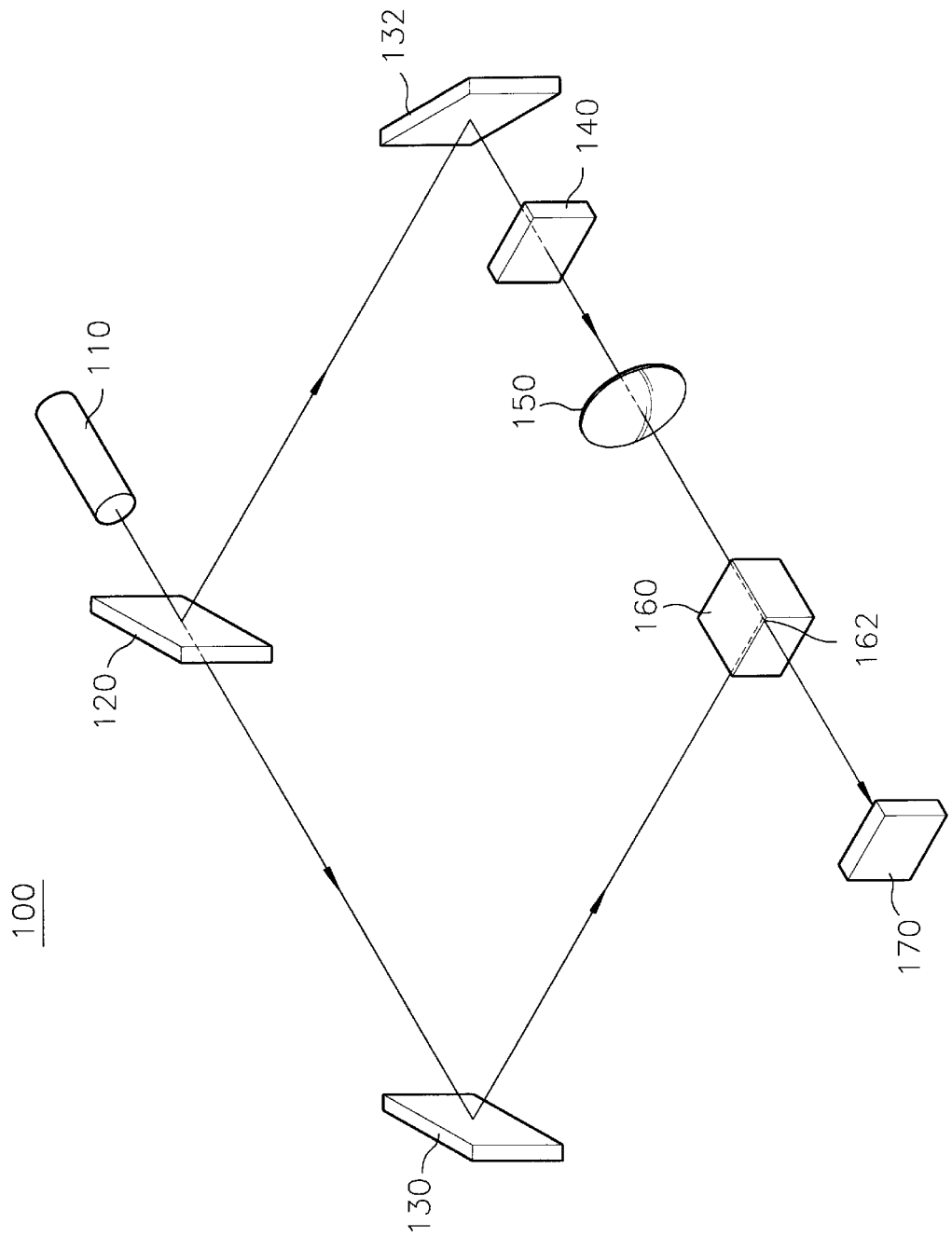
FIG. 1 represents a perspective view of the prior art volume holographic data storage system.
Figure 2:
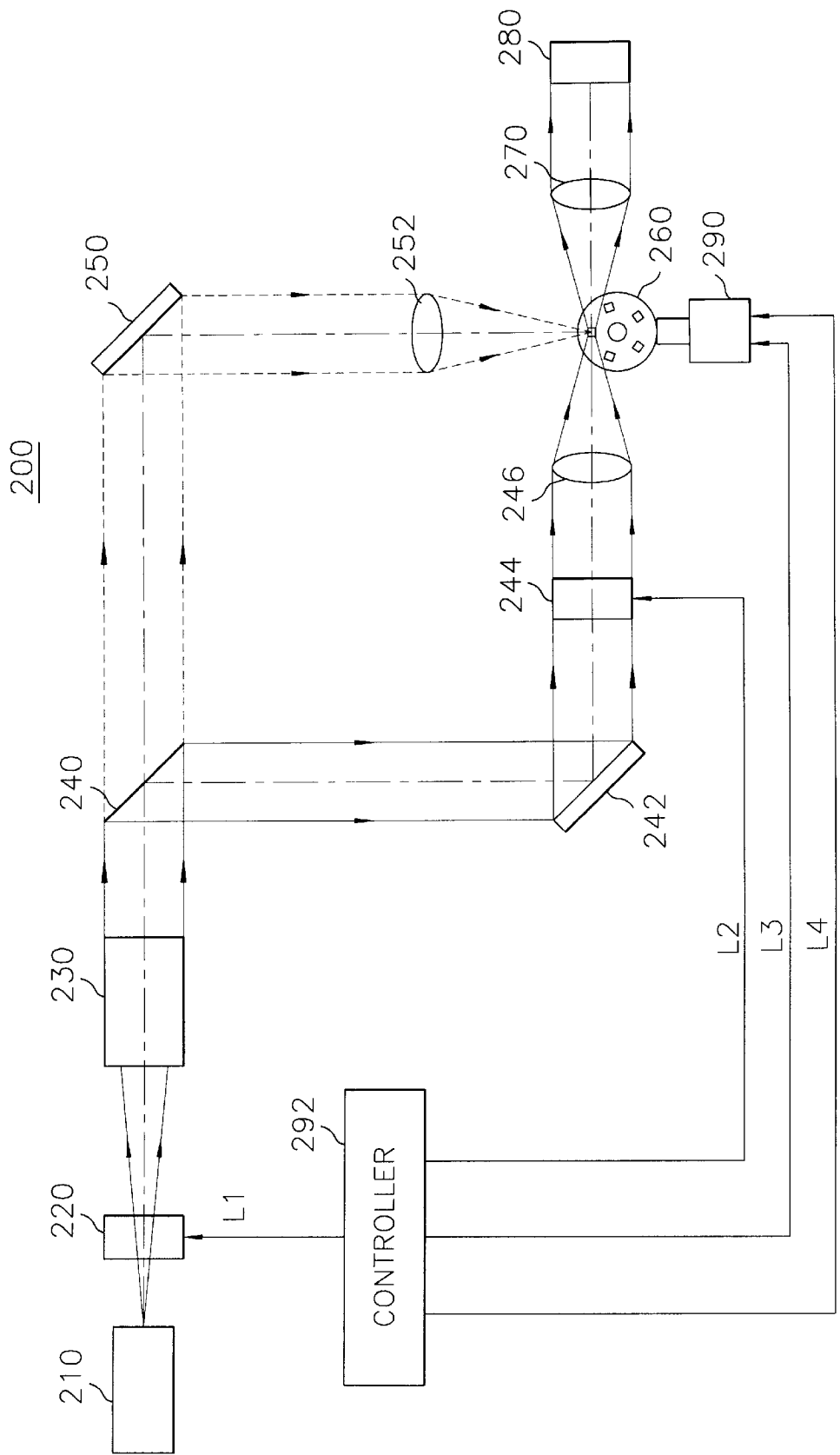
FIG. 2 shows a schematic cross-sectional view of the inventive volume holographic data storage system.

There are illustrated in FIGS. 2 and 3 various views of the inventive volume holographic data storage (VHDS) system in accordance with preferred embodiments of the present invention.

Figure 3A:
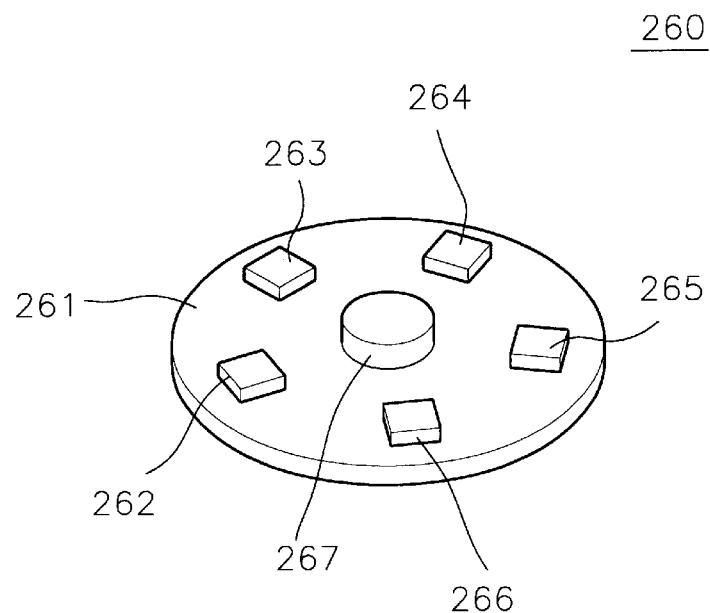
FIGS. 3A and 3B present an enlarged perspective and an enlarged plan views of the inventive storage device incorporated thereinto a plurality of storage media shown in FIG. 2, respectively.

There is illustrated in FIG. 2 a schematic cross-sectional view of an inventive volume holographic data storage (VHDS) system 200, capable of three-dimensionally storing a plurality of holograms into M number, e.g., 5, of storage media 262–266 in a storage device 260 as shown in FIG. 3A, wherein M is a positive integer. The VHDS system 200 incorporated therein the inventive storage device 260 comprises a light source 210 for generating a coherent light beam, a shutter 220, a beam expander 230, a beam splitter 240, a first and a second mirrors 242, 250, a spatial light modulator (SLM) 244, a first and a second lenses 246, 270, a beam imaging lens 252, a motor 290 for rotating the storage device 260, a charge coupled device (CCD) 280 and a controller 292.

In the VHDS system 200, the coherent light beam emitted from the light source 210, e.g., a He—Ne laser, travels to the beam expander 230 through the shutter 220 which is used for controlling the exposure time of the coherent light beam. The beam expander 230 expands the coherent light beam passing through the shutter 220.

Thereafter, the expanded light beam enters into the beam splitter 240 which is capable of partially reflecting the expanded light beam to thereby obtain a reference beam and a signal beam, wherein the reference beam is a portion of the expanded light beam transmitted through the beam splitter 240 and the signal beam is a remaining portion of the expanded light beam reflected from the beam splitter 240. It should be noted that in the VHDS system 200 of the present invention shown in FIG. 2, solid and dot lines from the beam splitter 240 represent optical paths of the signal and the reference beams, respectively.

In the meantime, the controller 292 initially rotates the motor 290 in such a way that a 1st recording area of the 1st storage medium 262 is aligned with a point which coincides with the focal points of the first lens 246 and the beam imaging lens 252.

The signal beam is reflected to the SLM 244, e.g., a liquid crystal light valve, by the first mirror 242 to thereby image the signal beam onto the SLM 244. The SLM 244 includes discrete modulating regions, e.g., an array of T×S modulating pixels, T and S being positive integers, respectively. Each of the T×S modulating pixels is controlled by a voltage applied thereto through an integrated circuit (not shown), whereby the SLM 244 controls an amplitude and a phase of the signal beam impinged onto each of the T×S modulating pixels. Therefore, the SLM 244 is capable of converting the signal beam impinged thereonto into a modulated signal beam which carries data in the form of pages after passing therethrough. If 1st input data is inputted to the SLM 244, the 1st modulated signal beam is focused on the 1st recording area of the 1st storage medium 262 by the first lens 246.

Figure 3B:
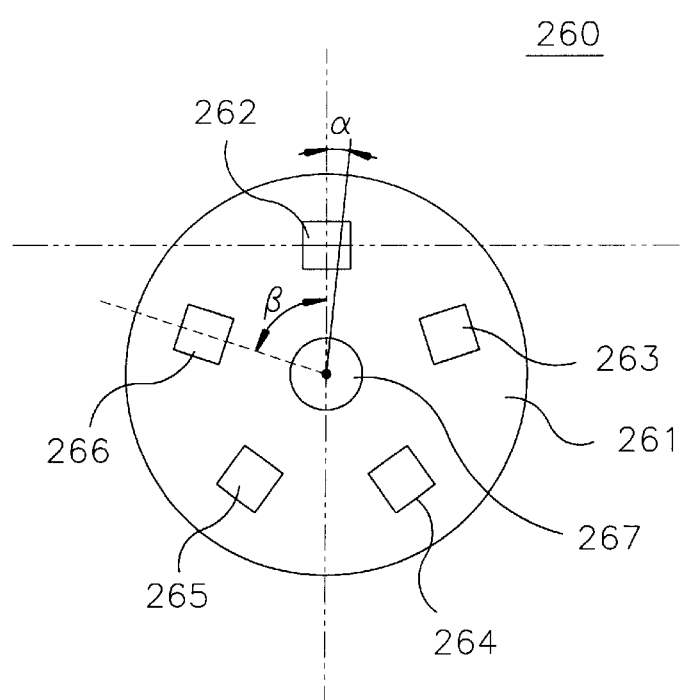

As shown in FIG. 3A, there is shown an enlarged perspective of the inventive storage device 260 incorporated thereinto a plurality of storage media shown in FIG. 2. In the preferred embodiment of the present invention, the storage device 260 includes a base 261 having a top surface in the form of a circular disk, five storage media 262–266 and a blocking member 267. The storage media 262–266 are mounted on the top surface of the base 261, angularly separated from each other by an angle of β degrees as shown in FIG. 3B. Each of the storage media 262–266 is made of a photorefractive crystal such as lithium niobate(LiNbO$_3$). For example, each of the storage media 262–266 is made of 0.03% Fe-doped lithium niobate(LiNbO$_3$:Fe) crystal and is in the form of a rectangular cube.

Even though the present invention has been described for a storage device with a plurality of storage media angularly separated from each other by an angle of β degrees for increasing the amount of holograms to be stored thereinto, the idea presented above can be extended to a storage device which incorporates thereinto a multiple number of storage media differently arranged for use with a VHDS system.

On the other hand, the reference beam is reflected to the beam imaging lens 252 by the second mirror 250 and focused on the 1st recording area of the 1st storage medium 262 by the beam imaging lens 252. The reference beam transmitted through 1st storage medium 262 is blocked by the blocking member 267 so that the reference beam does not affect the other storage media during the recordation of holograms thereinto.

In the 1st recording area of the 1st storage medium 262, the 1st modulated signal beam interferes with the reference beam to thereby generate a 1st interference pattern therebetween, wherein the 1st interference pattern contains information of the 1st modulated signal beam. The 1st interference pattern is transformed into an optical index pattern of the 1st recording area by changing the refractive index of the 1st recording area in response to the 1st interference pattern to thereby record the 1st modulated signal beam into the 1st recording area of the 1st storage medium 262. The 1st recording area is defined by an area of the 1st storage medium 262 where the reference signal beam overlaps with the 1st modulated signal beam.

The 1st modulated signal beam transmitted through the 1st storage medium 262 enters into the second lens 270, wherein the second lens 270 makes the modulated signal beam be parallel after passing therethrough. The modulated signal beam impinges onto the CCD 280 which is capable of detecting a distribution of light beam such as an image in the form of a page.

If another page of data, i.e., 2nd input data, to be modulated by the SLM 244 is recorded into a 2nd recording area of the 1st storage medium 262, the controller 292 generates a control signal and sends it to the SLM 244 via a line L2 for modulating the 2nd input data and to the shutter 220 for controlling the exposure time of the coherent light beam via a line L1. And also, the controller 292 generates a first motor signal and send it to the motor 290 via a line L3. In response to the first motor control signal, the motor 290 sequentially rotates the storage device 260 by an angle of a predetermined degrees, e.g., α, about an axis perpendicular to a plane which includes the reference and the signal beams after the 1st input data is recorded, thereby the 2nd recording area being aligned with the reference beam and the focal points of the first lens 246 and the beam imaging lens 252 as shown in FIG. 3B. The axis passes through the central point of the storage device 260 in a longitudinal direction thereof. Therefore, it allows the VHDS system 200 to multiplex by rotating the storage device 260.

In the preferred embodiment of the present invention, if recording on the 1st storage medium 262 is finished, the controller 292 generates a second motor control signal and sends it to the motor 290 via a line L4 for sequentially rotating the storage device 260 up to β degrees to the axis so as to align a central point of the 2nd storage medium 263 with the focal points of the first lens 246 and the beam imaging lens 252. The 2nd storage medium 263 is recorded by the same method as that of the 1st storage medium 262. And also, if recording on the 2nd storage medium 263 is finished, then the remaining storage media are recorded by the same method as that of the 2nd storage medium 263.

On the other hand, the holograms stored in each of the storage medium 262–266 may be sequentially reconstructed by illuminating the storage media 262–266 with the reference beam by rotating the storage device 260.

In comparison with the storage medium 160 for use with the prior art VHDS system 100, the inventive storage device 260 is capable of recording a much larger amount of data thereon. This is achieved by mounting a plurality of storage media 262–266 on the base 261 of the storage device 260 to increase the recording areas to be stored holograms thereinto.

While the present invention has been described with respect to the preferred embodiments, other modifications and variations may be made without departing from the spirit and scope of the present invention as set forth in the following claims.

What is claimed is:

1. A storage device for use in a volume holographic data storage system, the storage device comprising:

a base having a top surface;

N number of storage media, each of the storage media being mounted on the top surface of the base and made of a photorefractive crystal, N being a positive integer larger than 1 ; and means for rotating the base about an axis perpendicular to the top surface of the base.

2. The storage device of claim 1, wherein each of the storage media is angularly separated by an angle of β degrees.

3. The storage device of claim 1, wherein the photorefractive crystal is made of lithium niobate.

4. A volume holographic data storage system for storing a plurality of holograms, the storage system comprising:

a coherent light source configured to output a coherent light beam;

a beam splitter configured to split the coherent light beam into a reference beam and a signal beam;

a storage device for storing the holograms thereinto, the storage device including a base having a top surface and a plurality of storage media positioned thereon, each of the storage media being made of a photorefractive crystal and projecting above the top surface;

first and second lenses configured to focus the signal and reference beams, respectively, onto a cross point at which the signal and reference beams intersect; and a controller configured to selectively position one of the storage media at the cross point.

5. The volume holographic data storage system according to claim 4, further comprising a blocking member projecting above the top surface and configured to block a reference beam which has passed through one of the storage media.

6. A volume holographic data storage system for storing a plurality of holograms, the storage system comprising:

means for generating a choerent light beam;

means for splitting the coherent light beam into a reference and a signal beam;

a storage device for stdoring the holograms thereinto, the storage device including a base having a top surface and N number of storage media; N being a positive integer larger than 1, each of the sotrage media being mounted on the top surface of the base and made of a photorefractive crystal;

means for directing the signal and the referece beams to a cross point formed by intersecting therebetween, wherein thecross point is placed on a plane which includes the signal beams and trhe reference beam; and means for controlling the sotrage device in such a way that each of the storage media sequentially aligns with the cross point.

7. The storage system of claim 6, wherein the plane is parallel to the top surface of the base.

8. The storage system of claim 7, wherein each of the storage media is angularly separated by an angle of β degrees.

9. The storage system of claim 8, further comprising means for modulating the signal beam into data in the form of pages.

10. The storage system of claim 9, wherein the controlling means includes a motor and a controller for controlling the motor, wherein the controller generates a first and a second control signals based on the data inputted to the modulating means.

11. The storage system of claim 10, wherein, if the controller sends the first control signal to the motor, the motor rotates the storage device about an axis by an angle of α degrees, wherein the axis is perpendicular to the plane.

12. The storage system of claim 11, wherein, if recording on one of the storage media is finished, the controller sends the second control signal to the motor to rotate the storage device about the axis by an angle of β degrees.

13. The storage system of claim 12, wherein the axis passes through a center point of the storage device.

14. The storage system of claim 6, wherein the directing means includes a first and a second mirrors, the first and the second mirrors being used for reflecting the signal beam and the reference beam to one of the storage media in the storage device, respectively.

15. The storage system of claim 6, further comprising a charge coupled device for detecting a distribution of the modulated signal beam in the form of pages.

16. The storage system of claim 6, further comprising a shutter for controlling an exposure time of the coherent light beam.

17. The storage system of claim 6, wherein the base of the storage device is in the form of a circular disk.

18. The new storage system of claim 6, wherein the photorefractive crystal is made of lithium niobate.

* * * * *